(12) United States Patent
Fujimori

(10) Patent No.: US 6,491,399 B1
(45) Date of Patent: Dec. 10, 2002

(54) PROJECTOR

(75) Inventor: Motoyuki Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/716,385

(22) Filed: Nov. 21, 2000

(30) Foreign Application Priority Data

Nov. 24, 1999 (JP) .......................................... 11-333497

(51) Int. Cl.⁷ .............................................. G03B 21/28
(52) U.S. Cl. ............................ 353/33; 353/81; 353/119
(58) Field of Search .............................. 353/33, 81, 119

(56) References Cited

U.S. PATENT DOCUMENTS 6,322,217 B1 * 11/2001 Fujimori et al. ........ 353/119 X

* cited by examiner

Primary Examiner—W. B. Perkey
(74) Attorney, Agent, or Firm—Oliff & Berridge, PLC

(57) ABSTRACT

A projector which can have a low profile and a reduced size. Fixing parts for fixing a mounting part to a lower light guide are disposed at the periphery of the mounting part. The mounting part is not required to be sufficiently thick so that a fixing unit such as a threaded hole can be formed therein. Therefore, the thickness of the mounting part can be reduced, thereby reducing the overall height of the projector, whereby a low-profile and reduced-size projector is possible.

6 Claims, 14 Drawing Sheets

[FIG. 1]
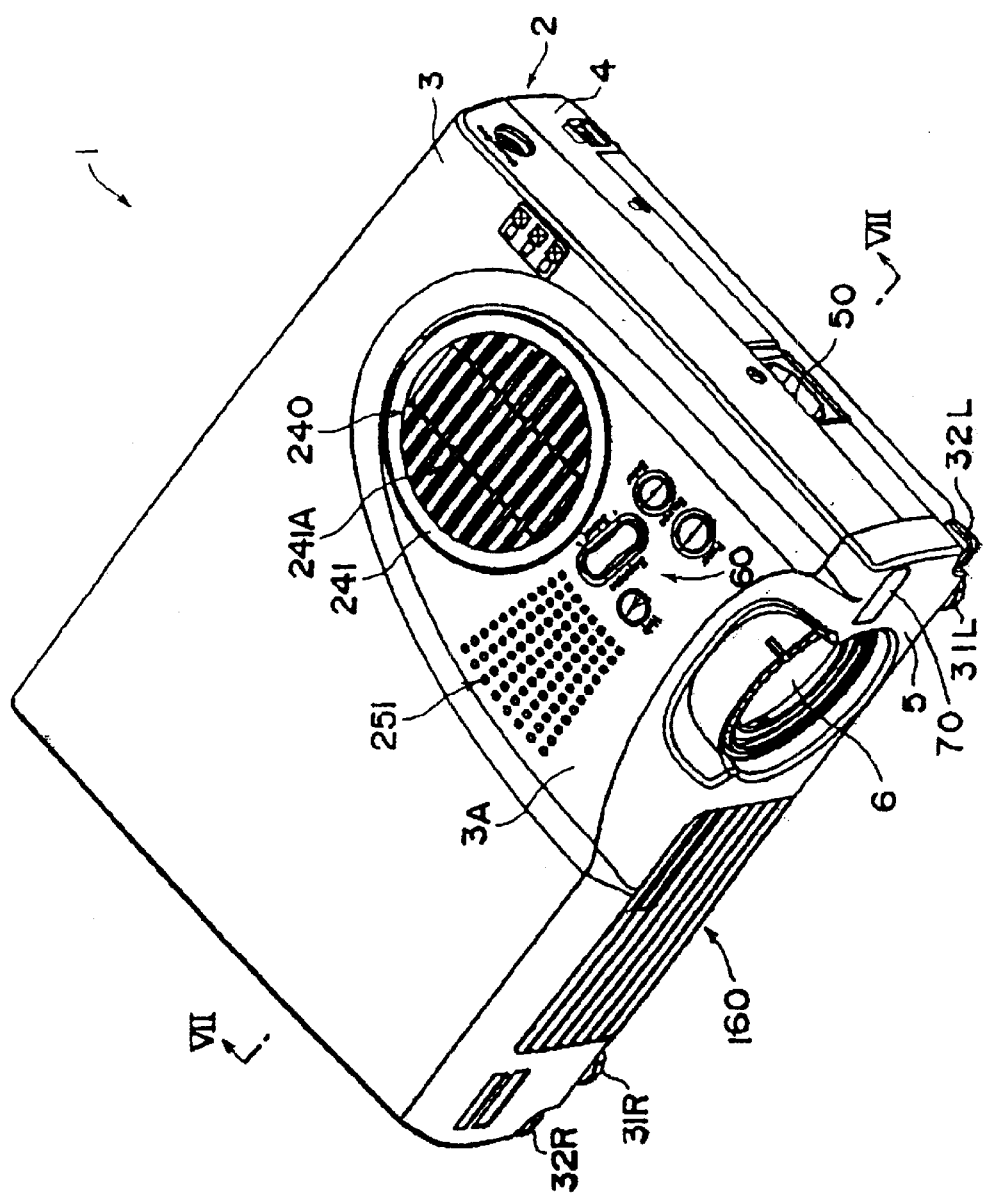

[FIG. 2]
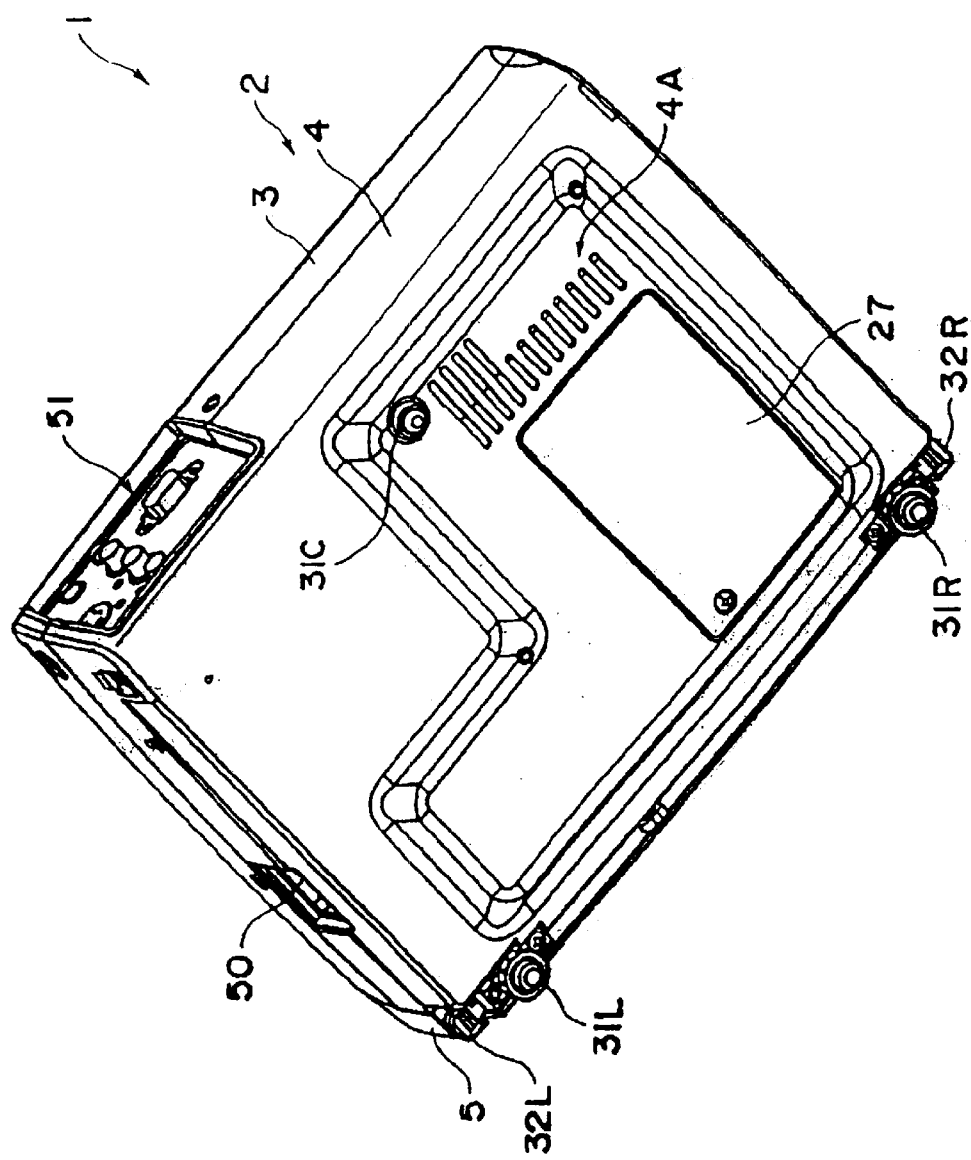

[FIG. 3]
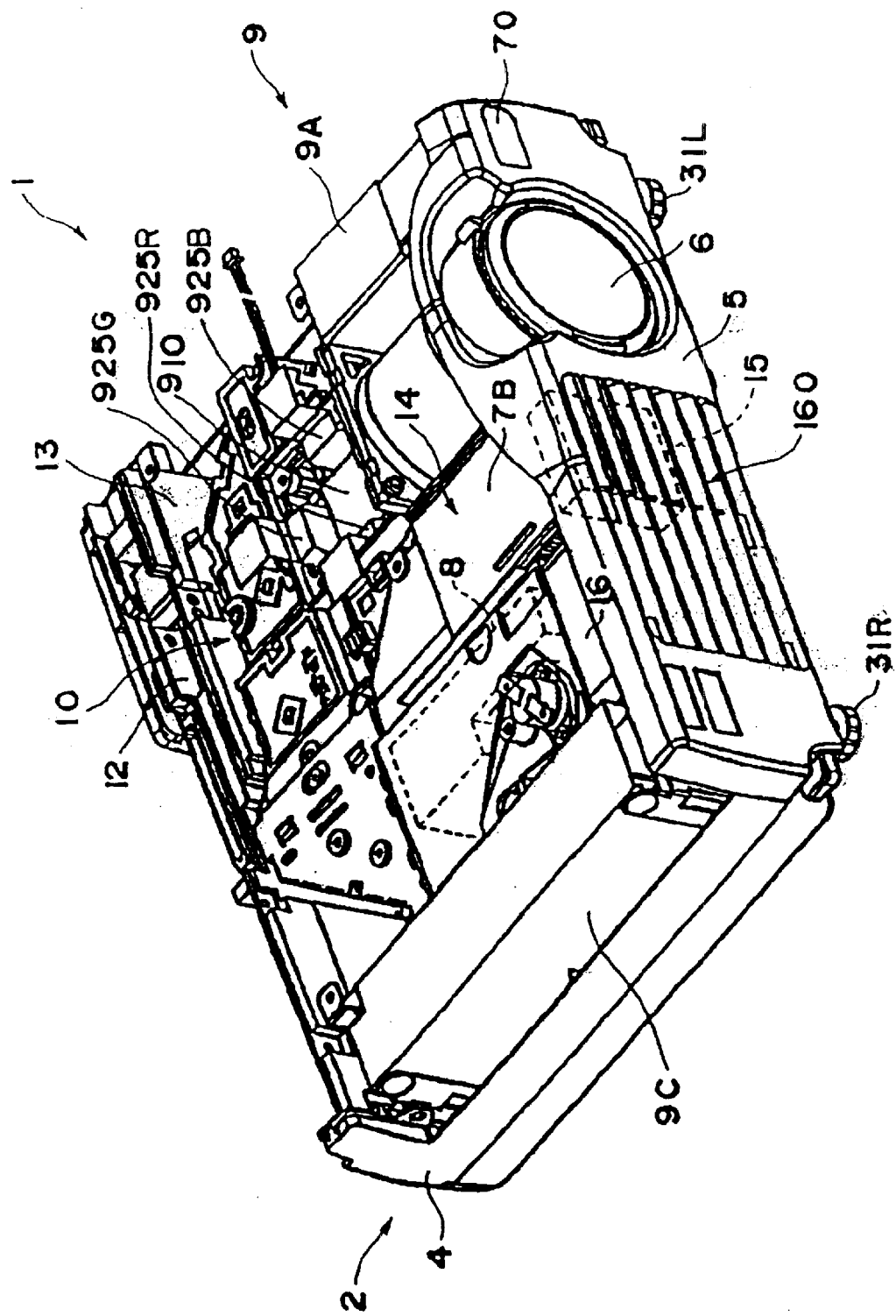

[FIG. 4]
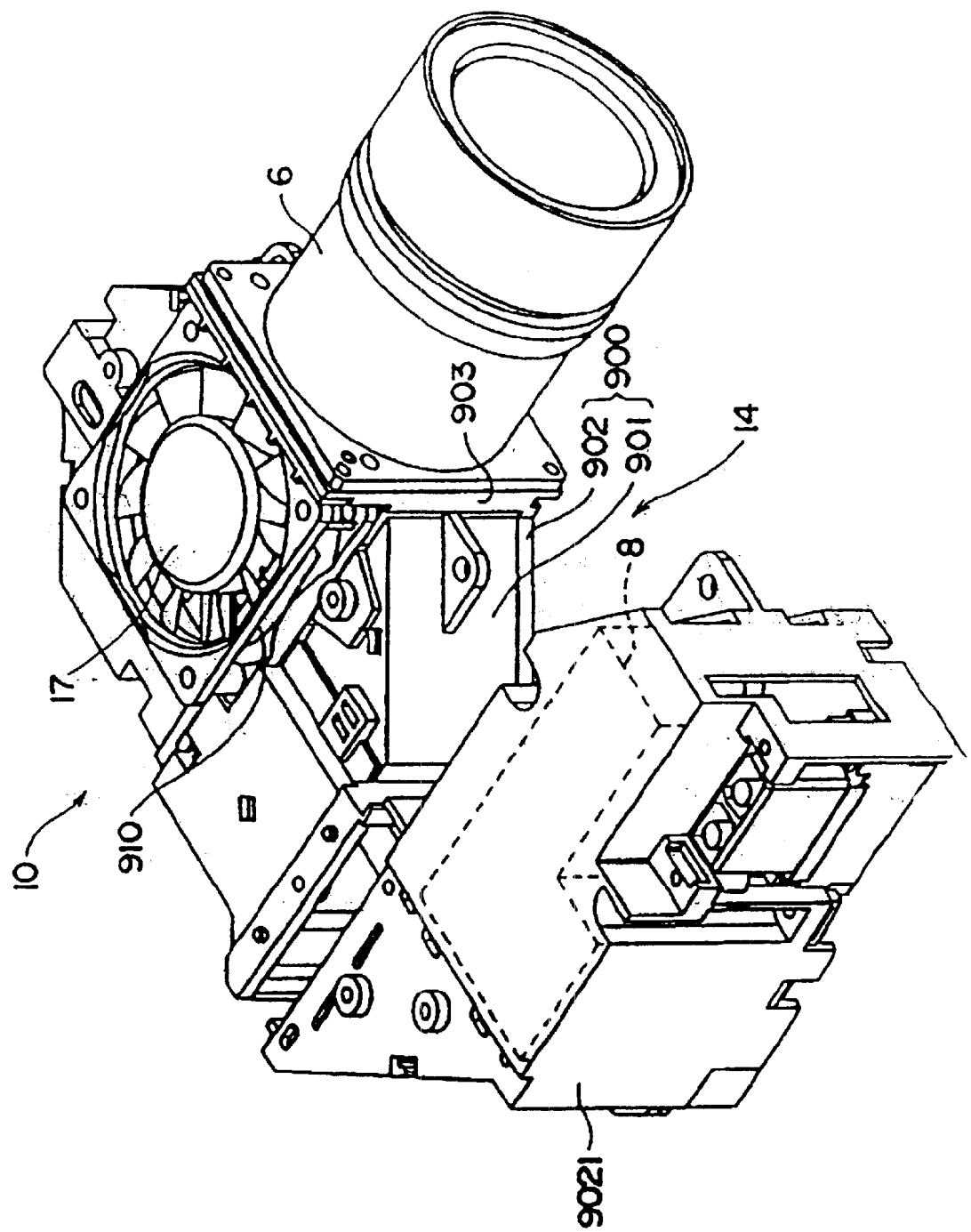

[FIG. 5]
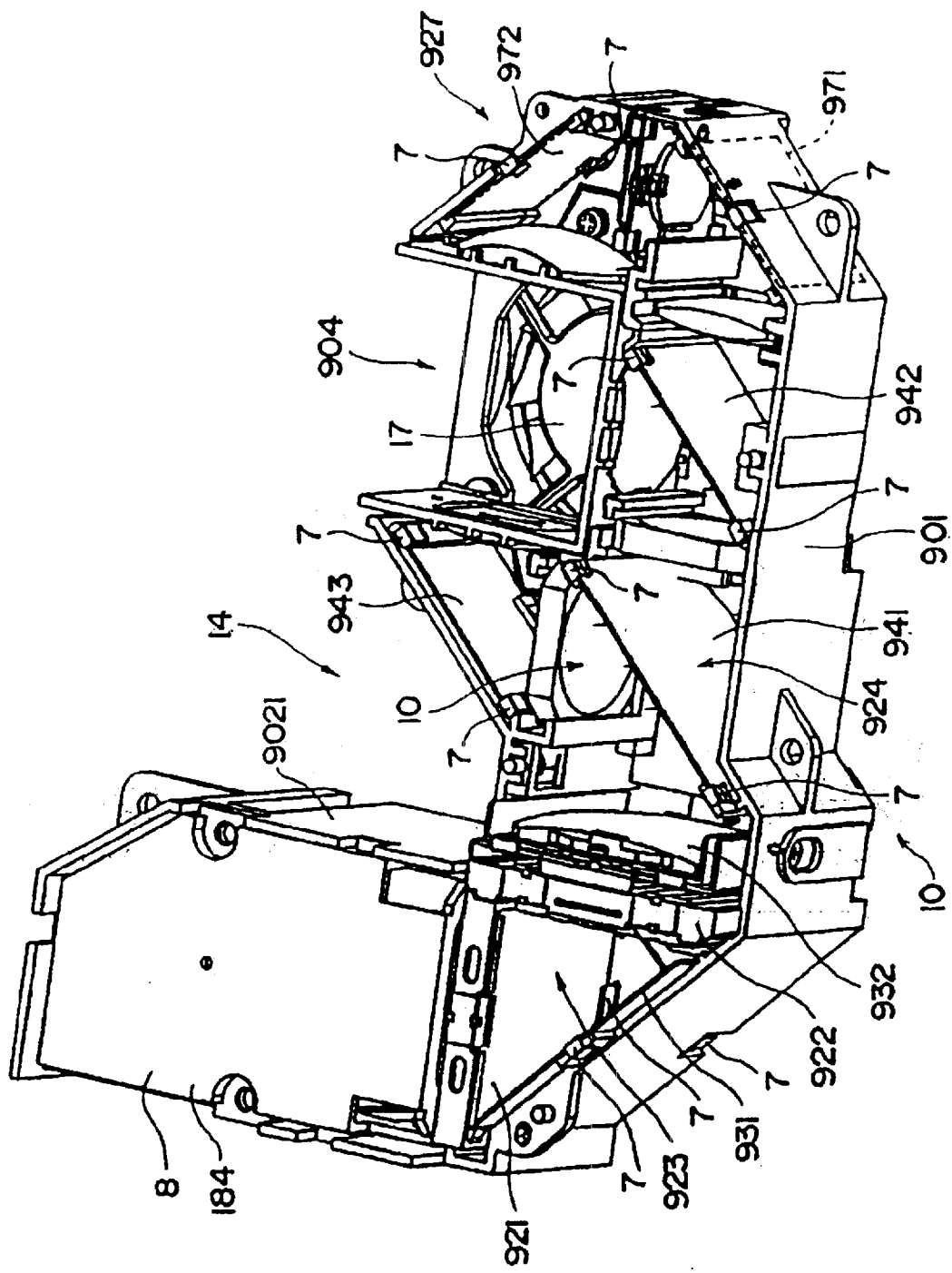

[FIG. 6]
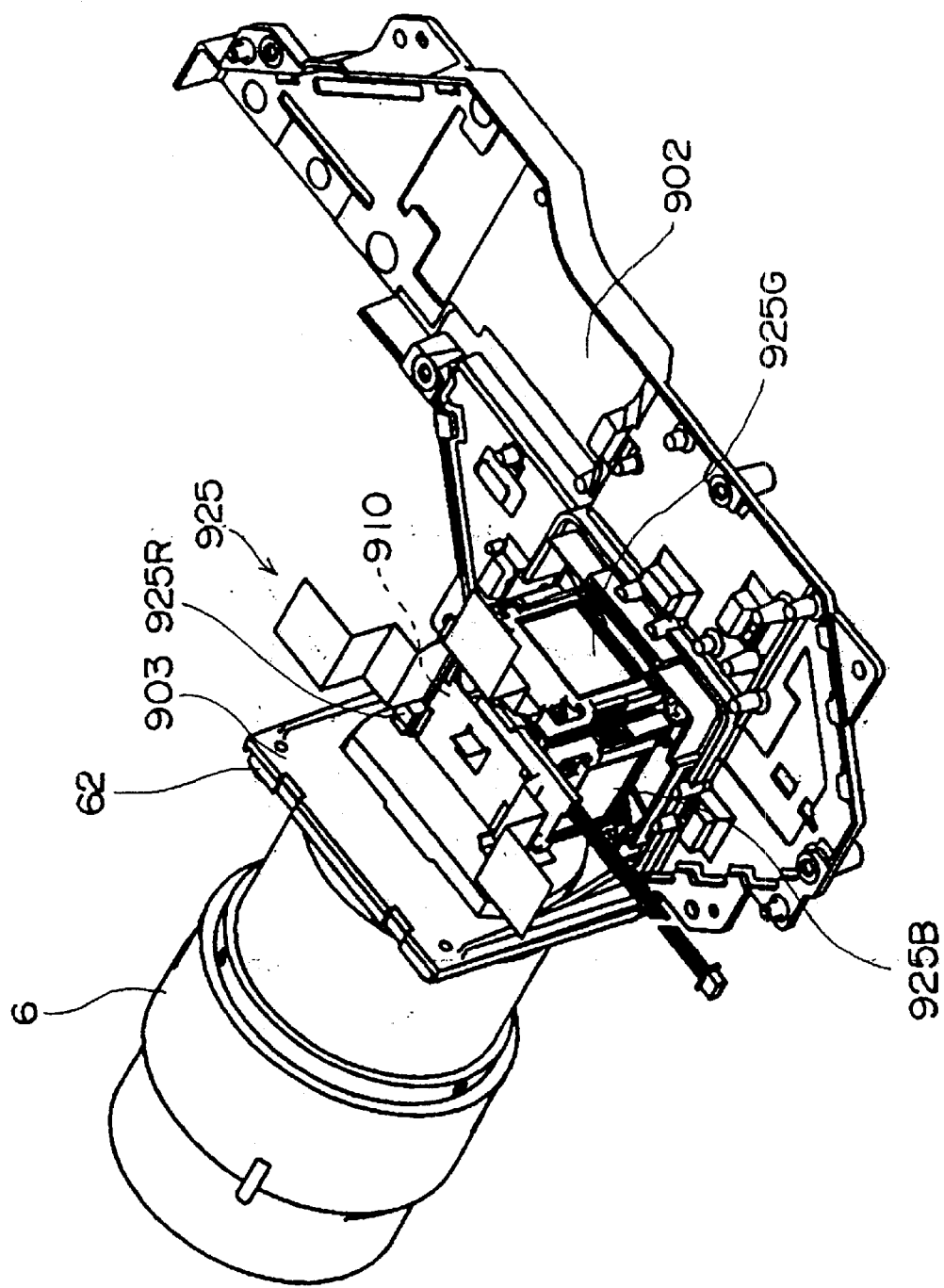

[FIG. 7]
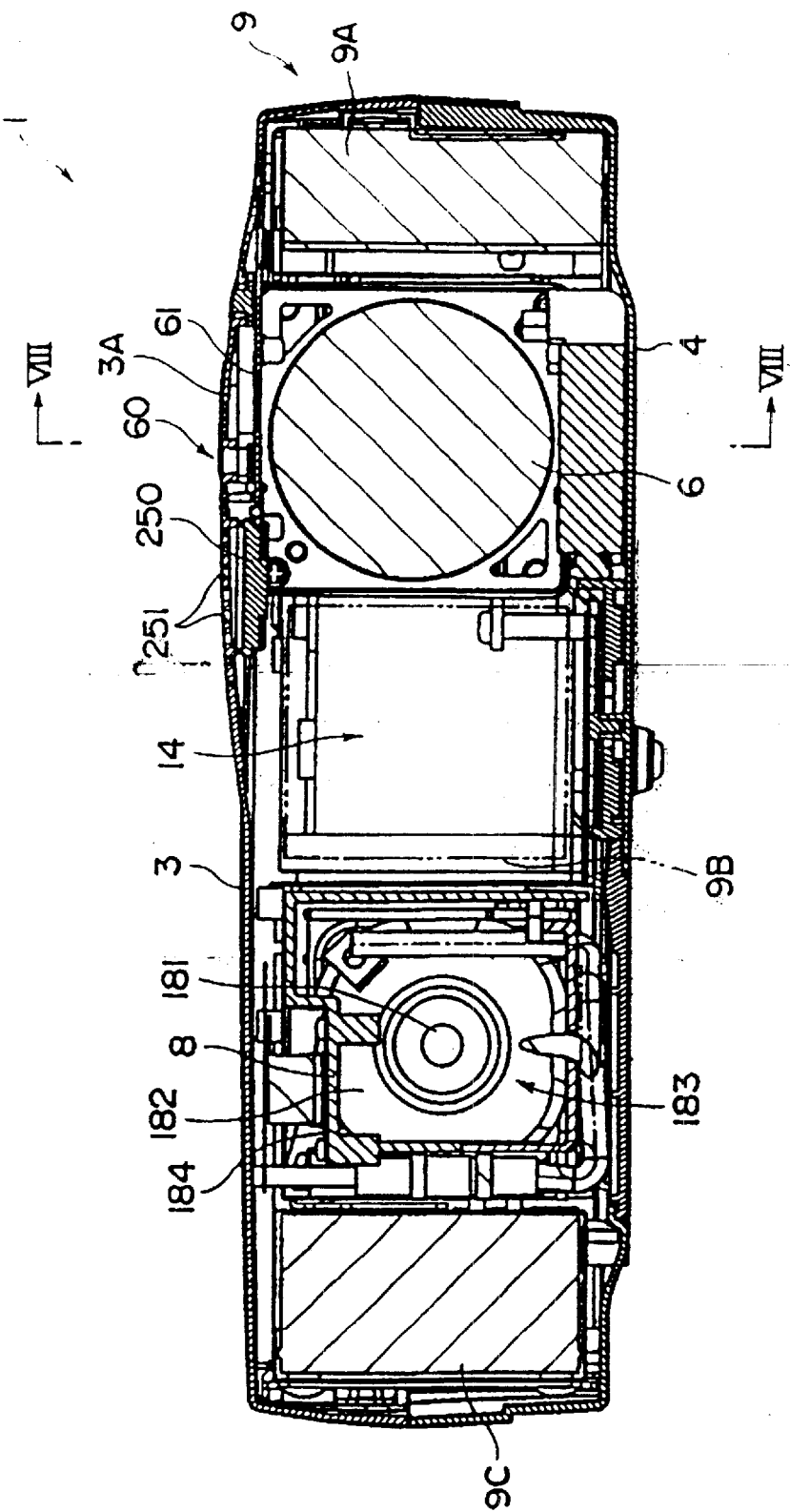

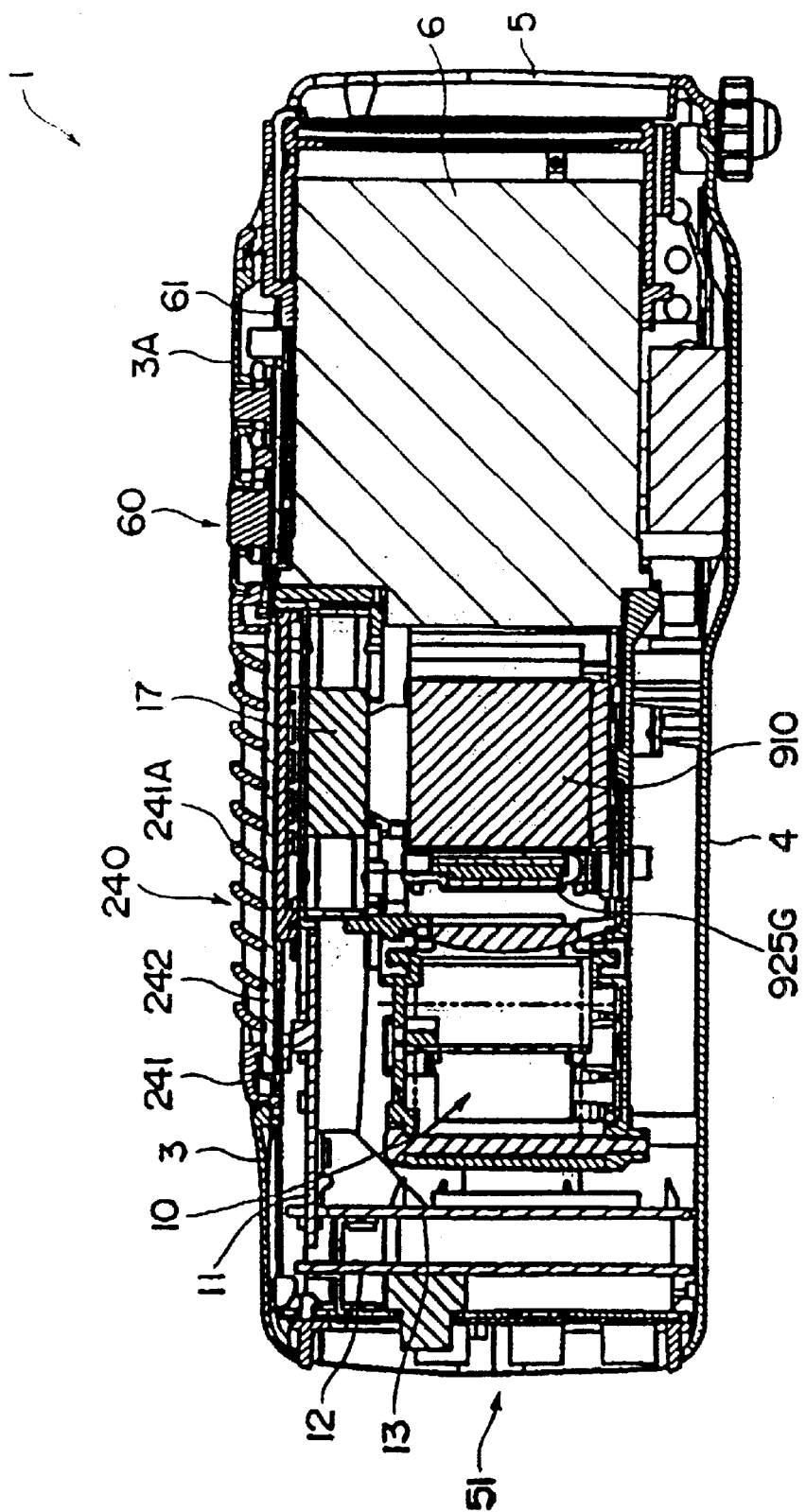
[FIG. 8]

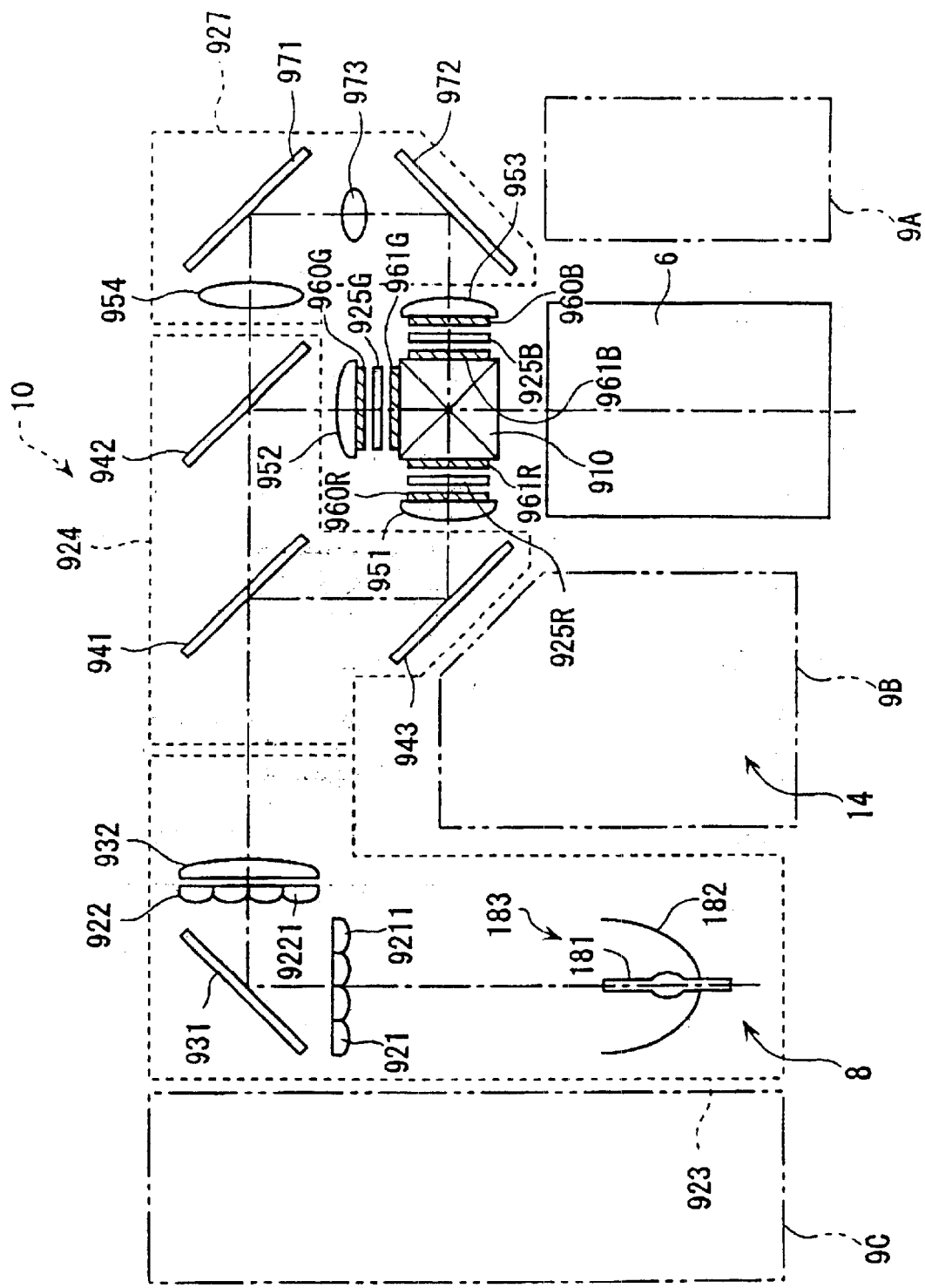
[FIG.9]

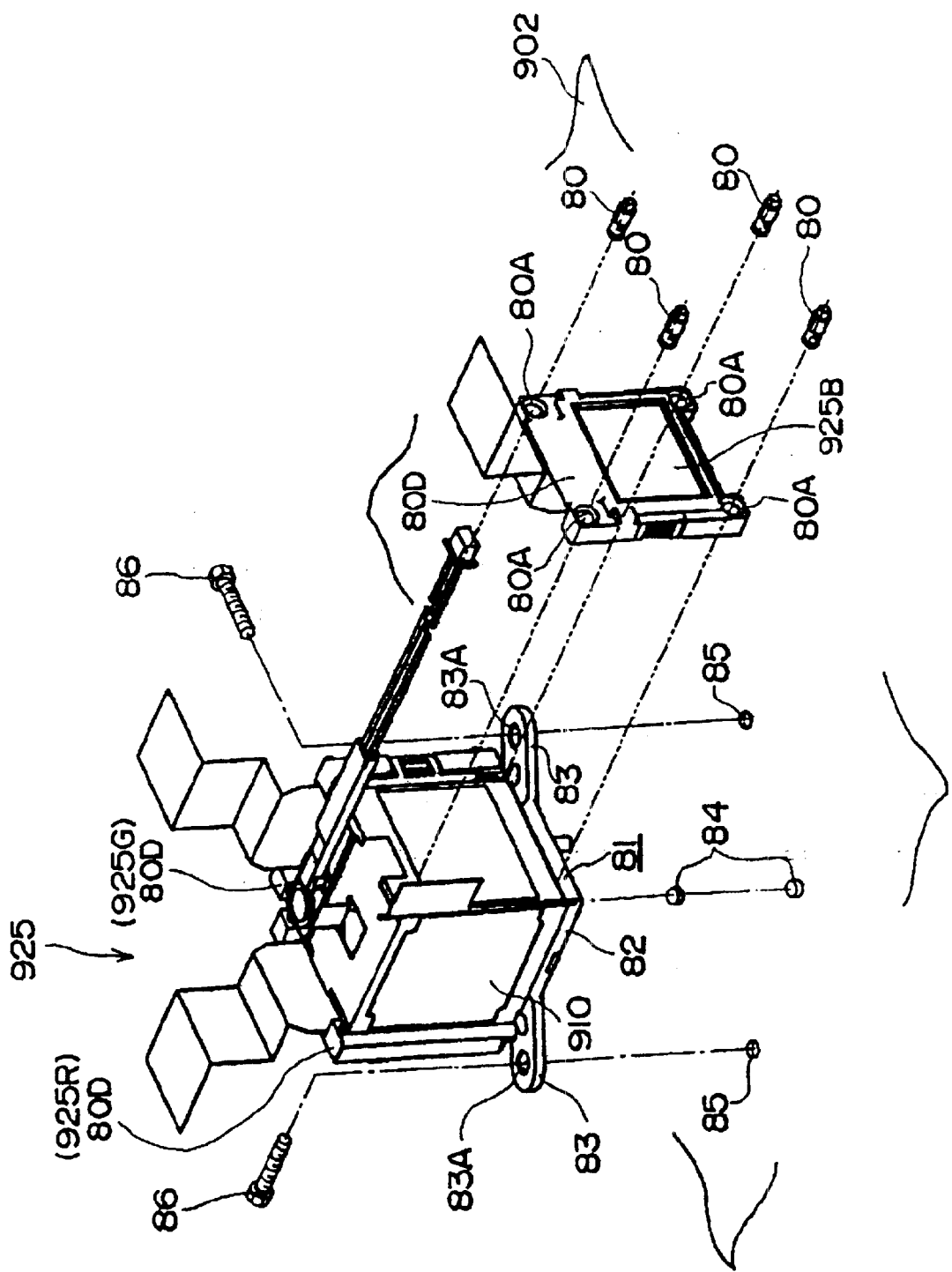
[FIG. 10]

[FIG. 11]
(A)
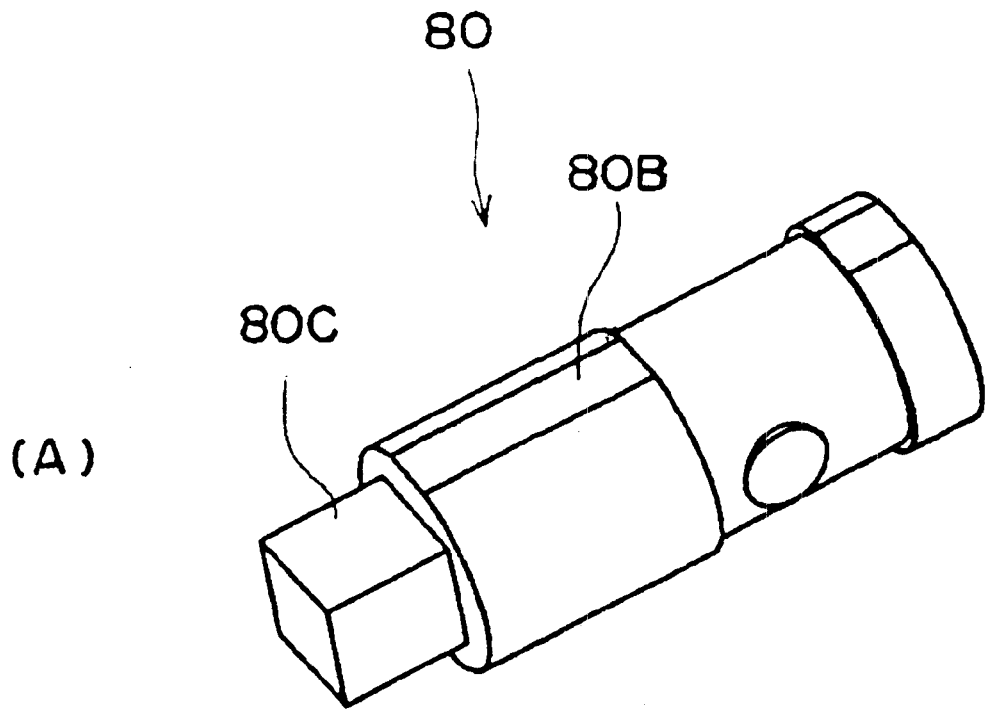
(B)
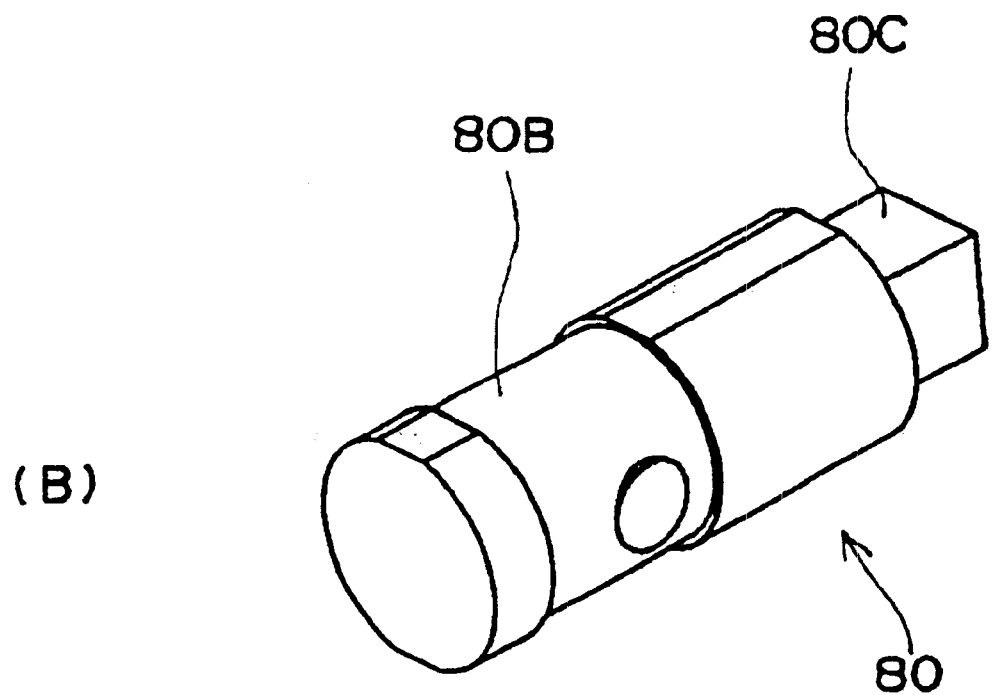

[FIG. 12]
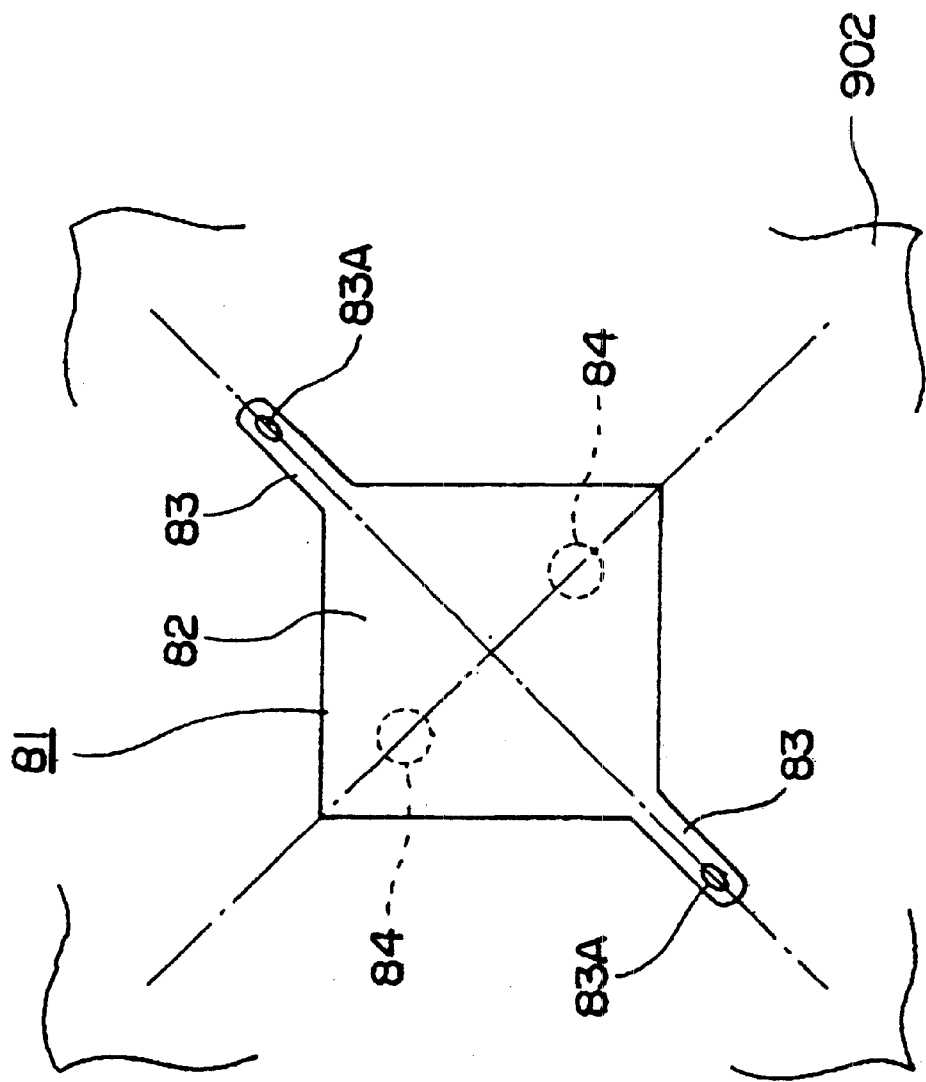

[FIG. 13]
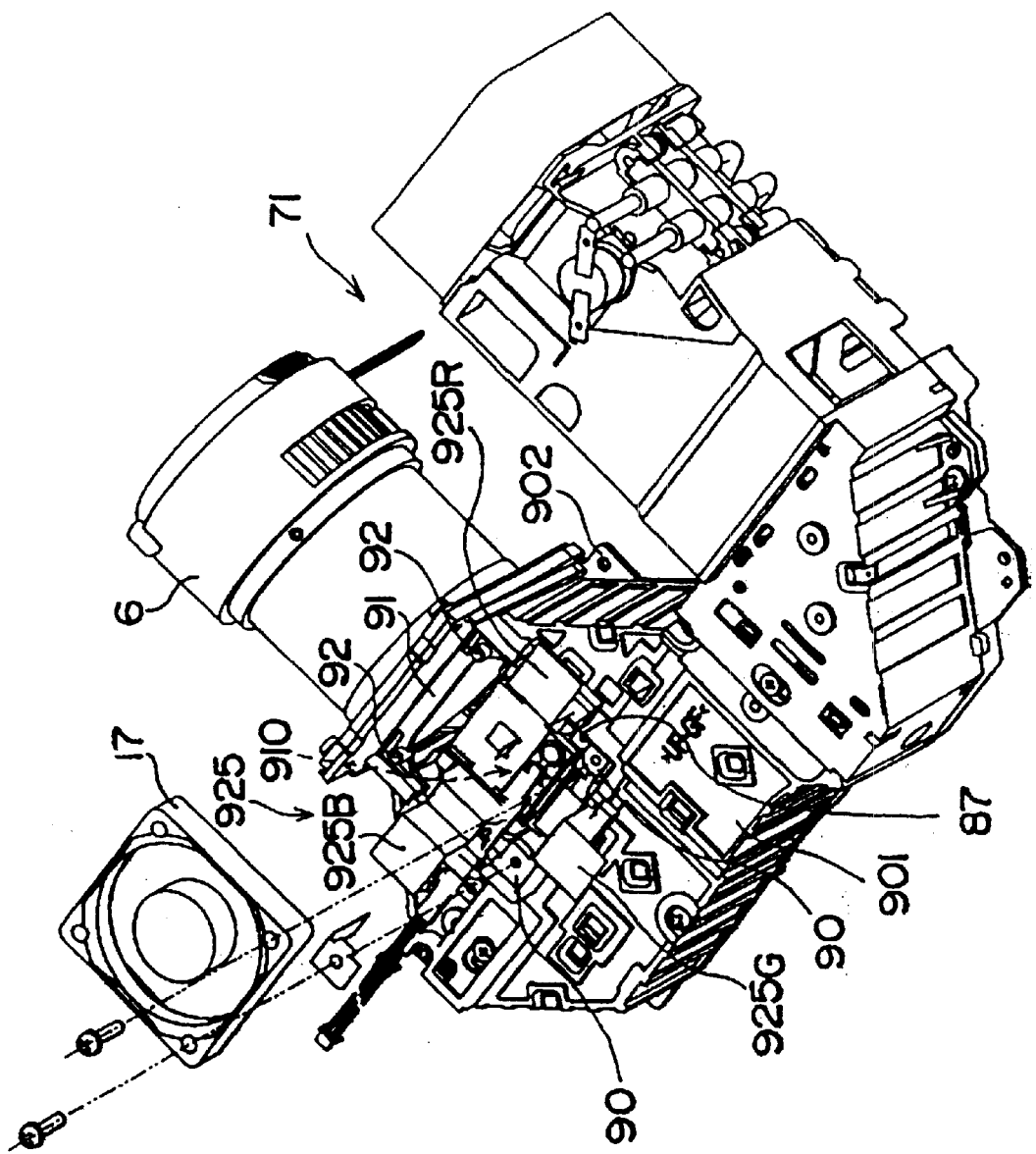

[FIG. 14]
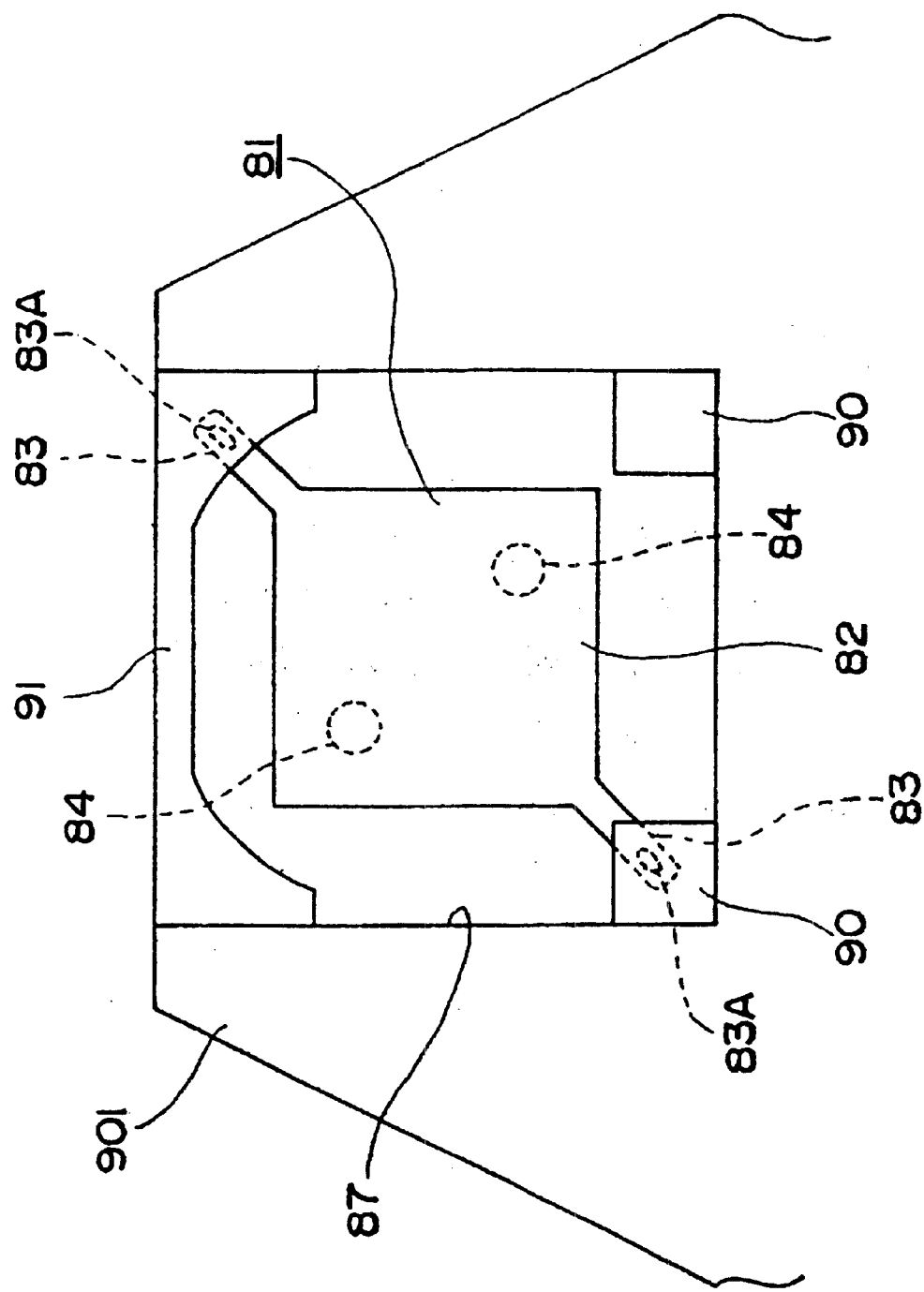

PROJECTOR

BACKGROUND OF THE INVENTION

1. Field of Invention

The present invention relates to a projector including a plurality of optical modulation devices that modulate a plurality of colored light beams in accordance with image data, a prism that synthesizes the modulated light beams modulated by the plurality of optical modulation devices, and an optical-component casing to which the prism is to be fixed.

2. Description of Related Art

Hitherto, projectors have been known which include three optical modulation devices that modulate three colored light beams in accordance with image data, a crossed dichroic prism that synthesizes the modulated light beams modulated by the optical modulation devices, upper and lower light guides which are an optical-element casing that receives optical components such as lenses and mirrors, and a projection lens that enlarges and projects the luminous fluxes synthesized for projection by the prism.

Projectors are used for multimedia presentations in public meetings, such as conferences, academic meetings, and exhibitions. The projector is brought to the conference room, or is occasionally removed to another place, as needed. Therefore, the reduction in size of projectors has progressed.

In the projector using three optical modulation devices, as described above, the crossed dichroic prism is generally disposed in a concave part defined by the light guide, and is mounted to a structure to which the projection lens is to be fixed. Hitherto, the prism has been mounted in a manner such that screws passing through the structure at the lower part thereof engage with threaded holes formed in a supporting member disposed at the lower part of the prism.

However, in such a known projector, the thickness of the supporting member must be sufficiently increased so that the depth of the threaded holes ensures engagement of the threaded holes with the screws. Therefore, the problem is that it is difficult to reduce the profile and size of the projector by reducing the thickness of the supporting member so as to reduce the overall height of the projector.

Accordingly, an object of the present invention is to provide a projector with a reduced profile and size.

SUMMARY OF THE INVENTION

According to the present invention, a projector includes a plurality of optical modulation devices that modulate a plurality of colored light beams in accordance with image data; a prism that synthesizes the modulated light beams modulated by the optical modulation device; and an optical-component casing to which the prism is to be fixed. The prism is fixed to the optical-component casing via a supporting member that supports the prism. The supporting member is provided with a mounting part on which the prism is mounted and fixed thereto and a fixing part by which the mounting part is fixed to the optical-component casing. The fixing part is disposed at the periphery of the mounting part and at the outside of a side face of the prism.

The fixing part is provided with through-holes formed therein that receive screws or an engaging member that engages with the optical-component casing.

With the arrangement according to the present invention, the mounting part is not required to have a thickness sufficient for forming therein a fixing member such as threaded holes due to a fixing part disposed at the periphery of the mounting part and outside side faces of the prism for fixing the mounting part to the optical-component casing. Therefore, the thickness of the mounting part can be reduced, thereby reducing the overall height of the projector, whereby a projector having a low profile and a reduced size is made possible.

Since the fixing part for fixing the mounting part to the optical-component casing is disposed at the periphery of the mounting part and outside the side faces of the prism, screws can be applied from the side at which the prism is mounted, and the screws passing through through-holes formed in the fixing part engage with threaded holes formed in the optical-component casing associated with the through holes. With this arrangement, the projector can be manufactured easily compared with a conventional projector having a structure in which the screws must be passed through from the side opposite to the side to which a prism is mounted.

In the projector according to the present invention, the mounting part may be formed in a substantially rectangular shape in plan view having four corners, and the fixing part is preferably disposed at a pair of corners, opposing each other along one diagonal line therebetween, of the four corners of the mounting part.

With this arrangement, the mounting part can be fixed to the optical-component casing in a well-balanced manner, and is not moved out of position by an external force.

The optical-component casing is preferably provided with a supporting part disposed in a position thereof associated with the other diagonal line of the mounting part on which the fixing part is not provided, for supporting the bottom of the mounting part.

With this arrangement, the mounting part is supported by and fixed to the optical-component casing at four points on the crossing diagonal lines of the mounting part, whereby fixture by the supporting member is made firmer.

The prism and the optical modulation devices are preferably disposed in a concave part defined by the optical-component casing and having a shape of the letter U in plan view. A cover for covering the fixing part is preferably provided so as to conceal the same when the concave part is viewed from the upper face or from the bottom of the prism.

The prism and a plurality of the optical modulation devices are affixed in an adjusted state so that a plurality of images are projected so as to be focused at the same position on a projection area. However, when the prism is moved by the user after the position of the prism and the plurality of optical modulation devices is set, the position of the prism and the optical modulation devices is changed, whereby there is a risk of disturbing the images projected on the projection area, such as a screen.

Therefore, the cover is provided in the optical-component casing for covering the fixing part so as to conceal the same in plan view. When the fixing part is concealed by the cover, the fixing part cannot be touched from the outside, thereby preventing deterioration of the image quality of the adjusted projector from being caused.

The optical-component casing may be provided with a fan-mounting part to which a cooling fan for cooling the plurality of optical modulation devices is fixed, and the fan-mounting part preferably also serves as the cover.

With this arrangement, the cover is not required to be individually provided in the projector, thereby simplifying the structure, whereby the projector can be easily assembled.

BRIEF DESCRIPTION OF THE DRAWINGS

FIG. 1 is an external perspective view from the upper side of a projector according to an embodiment of the present invention.

FIG. 2 is an external perspective view from the bottom of the projector according to the embodiment of the present invention.

FIG. 3 is a perspective view of the internal structure of the projector according to the embodiment of the present invention.

FIG. 4 is a perspective view of an optical system of the projector according to the embodiment of the present invention.

FIG. 5 is a perspective view of the structure of the optical system according to the embodiment of the present invention.

FIG. 6 is a perspective view of the structure of the optical system according to the embodiment of the present invention.

FIG. 7 is a vertical sectional view of the projector shown in FIG. I along line VII—VII.

FIG. 8 is a vertical sectional view of the projector shown in FIG. 7 along line VIII—VIII.

FIG. 9 is a schematic diagram showing the function of the optical system according to the embodiment of the present invention.

FIG. 10 is an exploded perspective view of a mounting structure for a liquid crystal panel and a crossed dichroic prism, according to the embodiment of the present invention.

FIG. 11 includes perspective views of a pin for fixing the liquid crystal panel to the crossed dichroic prism, according to the embodiment of the present invention.

FIG. 12 is a schematic plan view of a mounting structure of a supporting member according to the embodiment of the present invention.

FIG. 13 is an exploded perspective view of the internal structure of the projector according to the embodiment of the present invention.

FIG. 14 is a schematic plan view of the configuration of the supporting member according to the embodiment of the present invention.

DETAILED DESCRIPTION OF PREFERRED EMBODIMENTS

Embodiments according to the present invention are described below with reference to the drawings.

(1) General Configuration of the Device

FIGS. 1 and 2 are schematic perspective views of a projector 1 according to the present embodiment. FIG. 1 is a perspective view of the projector 1 from the upper side, and FIG. 2 is a perspective view thereof from the bottom.

The projector 1 is of a type in which a luminous flux emitted from a light source device as a light source is split into three luminous fluxes of the primary colors which are red (R), green (G), and blue (B). Each colored luminous flux is transmitted through and modulated, in accordance with image data, by a liquid crystal panel which is an optical modulation device. The modulated luminous fluxes of each color are synthesized by a crossed dichroic prism, and the synthesized fluxes are displayed to be enlarged on a projection area through a projection lens 6. Each component unit is received in an outer casing 2. The projection lens 6 is disposed so as to protrude from the outer casing 2, as needed, by a zoom mechanism.

(2) Structure of the Outer Casing

The outer casing 2 includes, as major components, an upper case 3 covering the upper portion of the device, a lower case 4 forming the bottom of the device, and a front case 5 covering the front. The upper case 3 and the lower case 4 are made by die-casting magnesium, and the front case 5 is made of resin.

The upper case 3 is provided with an air-inlet 240 in the upper face thereof toward the right from the center (in front view). The air-inlet 240 is covered by a filter-exchange cover 241 made of resin. The filter-exchange cover 241 is provided with slit-shaped holes 241A for introducing air from the outside into the device for cooling. An air filter 242 (see FIG. 8) is provided under the filter-exchange cover 241. By removing the filter-exchange cover 241 from the upper face of the upper case 3, the air filter 242 in the device can be exchanged.

A number of through-holes 251 for a speaker 250 (see FIG. 7) are formed in the upper face of the upper case 3 toward the front side from the filter-exchange cover 241. A control panel 60 for controlling the image quality and the like of the projector 1 is provided beside the through holes 251. A portion of the upper case 3 which is provided with the filter-exchange cover 241, the through-holes 251, and the control panel 60 is raised so as to form a raised part 3A, as shown in FIGS. 7 and 8. Components such as the air filter 242, the speaker 250, and a circuit board 61 for the control panel 60 are received in an inner space formed by the raised part 3A.

In FIG. 2, a lamp-exchange cover 27 is provided in the bottom face of the lower case 4. A lamp unit 8 (see FIGS. 3 and 4) is received under the lamp-exchange cover 27, and by removing the lamp-exchange cover 27, the lamp unit 8 is exchanged. Feet 31 R and 31 L are provided on the bottom face of the lower case 4 at the corners of the front part, and a foot 31C is provided on the bottom face of the lower case 4 at an intermediate part of the rear side. The feet 31R and 31L protrude and withdraw in the protruding direction by rotating a dial or by moving levers 32R and 32L. The height and inclination of a displayed picture plane can be changed by controlling the amount of protrusion of each of the feet 31R and 31L.

The front case 5 is provided with a light receiving part 70 at the right part of the face of the front case 5 for receiving optical signals from a remote controller which is not shown. The front case 5 is provided with an air outlet 160 substantially at the center of the front case 5 for discharging the air from the device.

The outer casing 2 is provided with terminals, such as an AC inlet 50 for connection to an external power supply, and various input and output terminals 51.

(3) Internal Structure of the Device

The internal structure of the projector 1 is shown in FIGS. 3 to 8. FIG. 3 is a schematic perspective view of the inside of the projector 1. FIG. 4 is a perspective view of an optical system. FIGS. 5 and 6 are perspective views of the inside of the optical system. FIGS. 7 and 8 show vertical sections of the projector 1.

As shown in these drawings, the light source lamp unit 8, a power supply unit 9, an optical unit 10, a driver board 11 (see FIG. 8), a main board 12, an AV board 13, and the like are disposed in the outer casing 2.

According to the present embodiment, the light source lamp unit 8, the optical unit 10, and the above-described projection lens 6 form a U-shaped (in plan view) optical system according to the present invention, as shown in FIG. 9. The boards 11, 12, and 13 constitute a control system according to the present invention.

The power supply unit 9 is configured with a first power supply block 9A disposed at the side of the projection lens 6 of the optical system, a second power supply block 9B disposed in a recess 14 formed in the U-shaped (in plan view) optical system at an intermediate part thereof, that is, between the projection lens 6 and the light source unit 8, and a third power supply block 9C disposed at the side of the light source lamp unit 8 of the optical system.

The first power supply block 9A is provided with the above-described AC inlet 50, and distributes the power supplied from an external power source through the AC inlet 50 to the second and third power supply blocks 9B and 9C.

The second power supply block 9B transforms the voltage of the power supplied by the first power supply block 9A, and supplies the transformed power to the main board 12 which is a major component of the control system. An auxiliary exhaust fan 15 to be driven by the power supplied by the second power supply block 9B is disposed at the air outlet 160 side of the second power supply block 9B.

The third power supply block 9C transforms the voltage of the power supplied by the first power supply block 9A, and supplies the transformed power to a light source device 183 (see FIG. 9) as a light source included in the light source lamp unit 8. Since the third power supply block 9C must supply power to the light source device 183 which consumes the greatest amount of electricity, the third power supply block 9C is larger than the first and second power supply blocks 9A and 9B, and is disposed along the entire projector 1.

The first, second, and third power supply blocks 9A, 9B, and 9C are fixed to the lower case 4 by screws or the like before affixing the projector lens 6 and the optical unit 10. The first power supply block 9A may supply power only to the second power supply block 9B, and the second power supply block 9B may distribute the power to the third power supply block 9C.

The light source lamp unit 8 functions as a light source for the projector 1. As shown in FIG. 9, the light source lamp unit 8 includes the light source device 183 including a light source lamp 181 and a concave mirror 182, and a lamp housing 184 containing the light source device 183.

The lamp housing 184 is provided with an on-off detector for determining whether or not the light source lamp 181 is in use.

The light source lamp unit 8 including the lamp housing 184 is covered by a receiving part 9021 which is formed integrally with an upper light guide 901 forming a light guide 900 which is an optical-component casing described below. The light source lamp unit 8 can be removed by removing the above-described lamp-exchange cover 27. A main exhaust fan 16 which is larger than the auxiliary exhaust fan 15 is disposed at the front of the receiving part 9021 at a position associated with the air outlet 160. The main exhaust fan 16 is driven by the power supplied from the second power supply block 9B.

The optical unit 10 forms an optical image by optically processing the luminous fluxes from the light source lamp unit 8 in accordance with image data. The optical unit 10 is provided with the light guide 900. The light guide 900 is configured with the upper light guide 901 which is made of a resin and is box-shaped and a lower light guide 902 which is made of magnesium and is lid-shaped. The optical unit 10 includes an illumination optical system 923, a colored-light-beam separating optical system 924, a modulation system 925, and a crossed dichroic prism 910. The lower light guide 902 is provided with a vertical head plate 903 to which the projection lens 6 is fixed. The optical elements of the optical unit 10, other than the modulation system 925 and the crossed dichroic prism 910, are held between the upper and lower light guides 901 and 902 to be sandwiched thereby.

The upper light guide 901 and the lower light guide 902 are assembled as a unit and are fixed to the lower case 4 side.

The crossed dichroic prism 910 is disposed behind the head plate 903, and is fixed to the lower light guide 902. Liquid crystal panels 925R, 925G, and 925B, which form the modulation system 925, are disposed opposing three faces of the crossed dichroic prism 910 and are fixed to the opposing faces thereof by a fixing material. The liquid crystal panels 925R, 925G, and 925B are positioned so that the liquid crystal panel 925B and the liquid crystal panel 925R oppose each other with the crossed dichroic prism 910 therebetween, and the liquid crystal panel 925G opposes the projection lens 6 with the crossed dichroic prism 910 therebetween. The liquid crystal panels 925R, 925G, and 925B are cooled by cooling air applied by an air intake fan 17 disposed above the crossed dichroic prism 910 and associated with the air-inlet 240. The power for driving the air intake fan 17 is supplied by the main board 12 through the driver board 11.

The driver board 11 for controlling the liquid crystal panels 925R, 925G, and 925B is disposed above the optical unit 10.

The main board 12 which is provided with a control circuit for controlling the entire projector 1 is disposed in a vertical manner at the rear side of the optical unit 10. The main board 12 and the driver board 11 disposed perpendicular to each other are electrically connected to each other via a connector. The main board 12 is connected through a cable to a lamp-signal-detecting circuit board for detecting signals from the on-off detector.

The AV board 13 is a circuit board provided with the input and output terminals 51, is disposed in a vertical manner between the optical unit 10 and the main board 12, and is electrically connected to the main board 12.

In the above-described internal structure, cooling air introduced by the air-intake fan 17 cools the modulation system 925, and is led to the side of the light source lamp unit 8, while cooling the boards 11, 12, and 13, by the rotation of the air exhaust fans 15 and 16. The cooling air led into the light source lamp unit 8 cools the light source device 183 included therein, together with fresh cooling air introduced through an inlet 4A (see FIG. 2) disposed at the bottom of the lower case 4. A part of the cooling air flows to the side of the second power supply block 9B, and the other part of the cooling air flows to the side of the third power supply block 9C, thereby cooling the second and third power supply blocks 9B and 9C. Thereafter, the cooling air is discharged to the front side of the projector 1 by the air-exhaust fans 15 and 16 through the air-outlet 160.

(4) Configuration of the Optical System

The optical unit 10 of the optical system is described in detail as follows with reference to FIGS. 5 and 9.

The optical unit 10 includes the illumination optical system 923, the colored-light-beam separating optical system 924, a relay optical system 927, and the modulation system 925 received in the upper light guide 901. The optical unit 10 also includes the crossed dichroic prism 910 fixed to the lower light guide 902, and the projection lens 6 fixed to the head plate 903 of the lower light guide 902.

The illumination optical system 923 is an integrator illumination optical system for evenly illuminating image forming regions of the three liquid crystal panels 925R, 925G, and 925B which form the modulation system 925. The illumination optical system 923 includes the light source device 183, a first lens array 921, a second lens array 922, a reflecting mirror 931, and an superimposing lens 932. The lens arrays 921 and 922, the superimposing lens 932, and the reflecting mirror 931 are disposed to be supported by vertical portions of the upper light guide 901, and are affixed by clips 7 which are members that prevent fall out, whereby these components do not fall out when the upper guide 901 is turned over in the state shown in FIG. 3.

The light source device 183 forming the illumination optical system 923 includes the light source lamp 181 which emits, as a radial beam emitter, radial light beams, and the concave mirror 182 which converts the radial light beams from the light source lamp 181 into substantially parallel luminous fluxes and emits the same. Generally, a halogen lamp, a metal halide lamp, or a high pressure mercury-vapor lamp is used as the light source lamp 181. A parabolic mirror or an ellipsoidal mirror is preferably used as the concave mirror 182.

The first lens array 921 includes small lenses 9211, having a substantially rectangular outline, aligned in a matrix having M rows and N columns. The small lenses 9211 split the parallel luminous flux incident from the light source into a plurality (M×N) of split luminous fluxes, and applies the split luminous fluxes in the vicinity of the second lens array 922 to form an image. Each small lens 9211 has an outline of a shape substantially the same as the shape of the image-forming region of each of the liquid crystal panels 925R, 925G, and 925B. For example, when the image-forming region of the liquid crystal panel has an aspect ratio (the ratio of the width to the height) of 4:3, the aspect ratio of each small lens is set to 4:3.

The second lens array 922 includes small lenses 9221 aligned in a matrix having M rows and N columns so as to be associated with the small lenses 9211 of the first lens array 921. The second lens array 922 arranges the center axes of the split luminous fluxes (principal rays) emitted by the first lens array 921 so that the principal rays are applied perpendicularly to the incidence plane of the superimposing lens 932. The superimposing lens 932 integrates the plurality of split luminous fluxes on the three liquid crystal panels 925R, 925G, and 925B. The second lens array 922 is disposed to be inclined by 90 degrees with respect to the first lens array 921 with the reflecting mirror 931 therebetween.

The reflecting mirror 931 guides the luminous fluxes emitted by the first lens array 921 to the second lens array 922. The reflecting mirror 931 is not always required depending on the configuration of an illumination optical system 923. For example, it is not necessary when the first lens array 921 and the light source are disposed parallel to the second lens array 922.

The colored-light-beam separating system 924 according to the present invention includes two dichroic mirrors 941 and 942 and a reflecting mirror 943, and splits the light beams from the superimposing lens 932 into three colored light beams of red, green, and blue. Each of the mirrors 941, 942, and 943 is supported by vertical portions of the upper light guide 901 and is fixed to the upper light guide 901 by the clips 7 in the same manner described above.

The relay optical system 927 includes an incident-side lens 954, a relay lens 973, and reflecting mirrors 971 and 972. The reflecting mirrors 971 and 972 are also fixed to the upper light guide 901 by the clips 7.

In the liquid crystal panels 925R, 925G, and 925B included in the modulation system 925, for example, polysilicon TFTs are used as switching elements. The liquid crystal panels 925R, 925G, and 925B are disposed in a concave part 904 (see FIG. 5) outside the upper light guide 901 and at the periphery thereof, and are fixed to the corresponding three faces of the crossed dichroic prism 910 by a fixing member in an opposed state. At the incident and emission sides of the liquid crystal panels 925R, 925G, and 925B, incident-side polarizing plates 960R, 960G, and 960B are disposed at the incident side, respectively, and emission-side polarizing plates 961R, 961G, and 961B are disposed at the emission side, respectively.

As shown in FIG. 10, the liquid crystal panels 925R, 925G, and 925B are disposed opposing three side faces, which are light-incident surfaces, of the crossed dichroic prism 910, and are bonded to the opposing faces (light-incident surfaces) via pins 80 and supporting frames 80D which constitute the fixing member. As shown in FIG. 11, the pin 80 includes a cylindrical insertion part 80B and a rectangular-columnar exposed part 80C which is exposed outside when the pin 80 is inserted. Each of the liquid crystal panels 925R, 925G, and 925B is supported by the supporting frame 80D. A hole 80A is formed in each of four corners of the supporting frame 80D. The pins 80 coated with an adhesive at the insertion parts 80B thereof are inserted into the holes 80A, and the adhesive is cured after the position of the liquid crystal panel 925R, 925G, and 925B are set, thereby fixing the liquid crystal panels 925R, 925G, and 925B to the side faces of the prism 910.

The crossed dichroic prism 910 forms a colored image by synthesizing three colored light beams. The crossed dichroic prism 910 is fixed to the upper face of the lower light guide 902 by fixing screws. The crossed dichroic prism 910 includes a multilayer dielectric film which reflects red light beams and a multilayer dielectric film which reflects blue light beams disposed substantially in an X-shape along the interfaces between four right-angle prisms. The three colored light beams are synthesized by these multilayer dielectric films.

The projection lens 6 is the heaviest component among the optical components of the projector 1. The projection lens 6 is fixed to the head plate 903 of the lower light guide 902 by screws or the like through a flange 62 disposed at a base end of the projection lens 6.

The optical unit 10 configured as described above is assembled as described below.

The box-shaped upper light guide 901 is placed so that the open side thereof is disposed upward. Optical components (reflecting mirrors, lenses, and the like) such as the illumination optical system 923, the colored-light-beam separating optical system 924, and the relay optical system 927 are placed in the upper light guide 901 and are fixed thereto by the clips 7.

The lid-shaped lower light guide 902 is provided thereon with the crossed dichroic prism 910 having the liquid crystal panels 925R, 925G, and 925B fixed thereto, the crossed dichroic prism 910 being fixed to the lid-shaped lower light guide 902. The projection lens 6 is fixed to the head plate 903. Then, the upper light guide 901 with the optical components fixed thereto is turned over, mounted so as to cover the lower light guide 902, and fixed thereto.

The light guide 900 thus configured is fixed to the lower case 4 by screws or the like.

The lower light guide 902 provided with the liquid crystal panels 925R, 925G, and 925B, the crossed dichroic prism 910, and the projection lens 6 mounted thereon may be fixed to the lower case 4 in advance, then, the upper light guide 901 provided with the optical components may be turned over, mounted so as to cover the lower light guide 902, and fixed to the lower case 4 by fixing members such as screws.

Only the lower light guide 902 may be fixed to the lower case 4 in advance by screws, then, the liquid crystal panels 925R, 925G, and 925B and the crossed dichroic prism 910 are mounted and the projection lens 6 is fixed to the lower light guide 902, and the upper light guide 901 provided with the optical components may be turned over, mounted so as to cover the lower light guide 902, and fixed to the lower case 4 by fixing members such as screws.

Although the crossed dichroic prism 910 and the projection lens 6 are fixed to the lower light guide 902 by screws, and the upper and lower light guides 901 and 902 are fixed to the lower case 4 by screws, other appropriate fixing methods such as bonding and engaging may be used.

(5) Functions of the Optical System

In the optical unit 10 shown in FIG. 9, substantially parallel luminous fluxes emitted by the light source device 183 are split into a plurality of split luminous fluxes by the first and second lens arrays 921 and 922 which form an integrator optical system (the illumination optical system 923). The split luminous fluxes from the small lenses 9211 of the first lens array 921 are applied, by the superimposing lens 932 substantially in an integrated fashion, to the image-forming regions of the liquid crystal panels 925R, 925G, and 925B. The liquid crystal panels 925R, 925G, and 925B are illuminated by luminous light substantially evenly distributed in a plane.

In this case, the first dichroic mirror 941 of the colored-light-beam separating optical system 924 reflects a red beam component and transmits green and blue beam components of the luminous flux from the illumination optical system 923. The red light beam reflected by the first dichroic mirror 941 is reflected by the reflecting mirror 943, transmitted through a field lens 951, and applied to the red liquid crystal panel 925R. The field lens 951 converts each split luminous flux from the second lens array 922 into a luminous flux parallel to the central axis (principal ray) of the split luminous flux. The field lenses 952 and 953 provided in front of the liquid crystal panels 925G and 925B have the same function.

The green light beam separated from the green and blue light beams transmitted through the first dichroic mirror 941 is reflected by the second dichroic mirror 942, transmitted through a field lens 952, and applied to the green liquid crystal panel 925G. The blue light beam is transmitted through the second dichroic mirror 942, through the relay optical system 927 and a field lens 953, and is applied to the blue crystal panel 925B. The relay optical system 927 for the blue light beam is provided for preventing the efficiency in usage of the light from being reduced due to light spreading which is likely to occur because the optical path of blue light beam is longer than that of the other color light beams. That is, the relay optical system 927 is provided in order to transmit, as it is, the split luminous flux incident on the incident-side lens 954 to the field lens 953.

When the red, green, and blue light beams are applied to the liquid crystal panels 925R, 925G, and 925B, respectively, the incident-side polarizing plates 960R, 960G, and 960B transmit particular polarized-beams of the incident light beams. The polarized beams are modulated by the liquid crystal panels 925R, 925G, and 925B in accordance with given image data, and are applied to the emission-side polarizing plates 961R, 961G, and 961B, respectively, as modulated beams. The emission-side polarizing plates 961R, 961G, and 961B transmit particular polarized-beams of the modulated beams, and the polarized beams are applied to the crossed dichroic prism 910. The polarized light beams of the colored light beams are converted to synthesized light beams by being synthesized by the crossed dichroic prism 910, and are emitted toward the projection lens 6. The synthesized light beams are projected by the projection lens 6 as colored images on a projection area such as a projection screen.

(6) Mounting Structure of the Crossed Dichroic Prism 910

The crossed dichroic prism 910 is mounted on and fixed to the lower light guide 902 via a supporting member 81 for supporting the crossed dichroic prism 910. As shown in FIGS. 10 and 12, the supporting member 81 includes a mounting part 82 and fixing parts 83 for fixing the mounting part 82 to the lower light guide 902. The mounting part 82 formed in a substantially rectangular shape in plan view, having four corners, of a size substantially the same as the bottom of the crossed dichroic prism 910 is fixed to the bottom of the crossed dichroic prism 910 via an adhesive. The fixing parts 83 formed in a substantially rectangular shape are disposed at the periphery of the mounting part 82 and at the outside of the crossed dichroic prism 910. The fixing parts 83 are disposed at a pair of corners, opposing each other along the diagonal line therebetween, of the four corners of the mounting part 82. Each fixing part 83 is provided with a through-hole 83A formed therein for receiving a screw 86 passing therethrough. Threaded holes 85, with which the screws 86 passing through the through-holes 83A are engaged, are formed in the lower light guide 902 at positions thereof associated with the through-holes 83A.

The lower light guide 902 for receiving the supporting member 81, which is to be mounted on and fixed to the lower light guide 902, is provided with two cylindrical supporting parts 84. As shown in detail in FIG. 12, the supporting parts 84 are disposed at positions of the lower light guide 902 to be associated, when the mounting part 82 is mounted, with a diagonal line of the mounting part 82 along which the fixing parts 83 are not disposed. With this arrangement, the mounting part 82 can be supported at the bottom along the diagonal line thereof along which the fixing parts 83 are not provided. Although not shown in FIG. 12, the lower light guide 902 is provided with holes formed therein for restricting the position of the crossed dichroic prism 910 in the horizontal directions. The crossed dichroic prism 910 can be disposed at a predetermined position by engaging protrusions formed at the bottom of the mounting part 82 with the holes formed in the lower light guide 902.

As shown in FIGS. 13 and 14, the liquid crystal panels 925R, 925G, and 925B and the crossed dichroic prism 910 are disposed in a concave part 87 defined by the upper light guide 901 in a U-shape in plan view. At the inside in plan view of the concave part 87, mounting parts 90 and 91 are provided for affixing the air-intake fan 17. The fan-mounting part 90 serving for affixing the air-intake fan 17 by screws is formed as rectangular plate and is disposed at each of two corners in the concave part 87 at the side of the liquid crystal panel 925G. The fan-mounting part 91 is formed in an extended form including two engaging parts 92 at two ends thereof for engaging with the air-intake fan 17, the fan-mounting part 91 being disposed to span an opening of the concave part 87 at the side of the projection lens 6. The fixing parts 83 are covered by the fan-mounting parts 90 and 91, as shown in FIG. 14. Therefore, the screws passing through the fixing parts 83 cannot be removed to the upper side of the concave part 87 since they are prevented by the fan-mounting parts 90 and 91. That is, the fan-mounting parts 90 and 91 serve also as a cover for covering so as to conceal the fixing parts 83 in plan view.

The present embodiments offer the following advantages.

The fixing parts 83 are provided at the periphery of the mounting part 82 and outside the side faces of the prism, whereby the mounting part 82 is not required to have a thickness in which a fixing unit such as a threaded hole can be formed. The thickness of the mounting part 82 can be reduced, thereby reducing the overall height of the projector 1. With this arrangement, the projector 1 can be reduced in profile and in size. A structure including the head plate 903 serves as the lower light guide 902. Since the lower light guide 902 is provided with the threaded holes 85 formed to be associated with the through-holes 83A, the screws 86 can be inserted from the side of the fixing parts 83 so that the screws 86 engage with the threaded holes 85 formed in the lower light guide 902. With this arrangement, the projector 1 can be manufactured easily compared with that having a conventional structure.

Since the fixing parts 83 are disposed at a pair of corners of the mounting part 82 opposing each other along the diagonal line therebetween, the mounting part 82 can be fixed to the lower light guide in a well-balanced manner and is not moved out of position by an external force.

The lower light guide 902 is provided with the supporting parts 84, whereby the mounting part 82 can be supported by and fixed to the lower light guide 902 at four points on the diagonal lines of the mounting part 82 crossing each other, thereby making fixture of the supporting member 81 firmer.

Since covers for covering and concealing the fixing parts 83 in plan view are formed inside the concave part 87 defined by the upper light guide 901 so as to conceal the fixing parts 83, the screws 86 passing through the fixing parts 83 cannot be removed when the projector 1 is opened due to them being obstructed by the covers. With this arrangement, after setting, the image quality of the projector 1 can be prevented from being deteriorated.

Since the fan-mounting parts 90 and 91 also serve as covers, independent covers are not required to be provided in the projector 1, thereby simplifying the structure. With this arrangement, the projector 1 can be assembled easily.

The present invention is not limited to the above-described embodiment, and includes other arrangements, such as the modifications described below, by which the object of the present invention is achieved.

For example, although the fan-mounting parts 90 and 91 also serve as covers, according to the above-described embodiment, the projector 1 may be provided with independent covers in the projector 1.

Although the covers are provided according to the above-described embodiment, the covers may be omitted by affixing the fixing parts by an adhesive so that the fixing parts are not removed.

Although the lower light guide 902 is provided with the supporting parts 84, according to the above-described embodiment, the supporting parts 84 may be omitted by firmly fixing the supporting member 81 to the lower light guide 902 so as not to be removed by a strong external force.

Although the head plate 903 and the lower light guide 902 are formed as a unit, according to the above-described embodiment, a head structure instead may be configured according to the present invention, for example, with a head plate and a mounting plate for mounting a crossed dichroic prism, the head plate and the mounting plate forming the substantially L-shaped head structure. With this arrangement, the same effect can be obtained as in the above-described embodiment, and the manufacturing operation of the projector can be made easier because the head structure is simply handled.

Although the fixing parts 83 are disposed at a pair of corners, opposing each other along the diagonal line therebetween, of the mounting part 82, the fixing parts 83 may be disposed at corners adjacent to each other, or on side members opposing each other as long as the fixing parts 83 are disposed at the periphery of the mounting part 82 and affixed firmly thereto. The position of the fixing parts may be determined appropriately when carrying out the invention.

The mounting part is not limited to be formed in a rectangle in plan view, and may be formed, for example, in a circle in plan view or in a triangle in plan view.

The fixing parts are not limited to those provided with through-holes. For example, a engaging member for engaging with the lower light guide may be used.

According to the above-described embodiment, although a crossed dichroic prism is used in which two types of multilayer dielectric films are formed substantially in an X-shape along the interfaces between four right-angle prisms, a prism may be used instead of the crossed dichroic prism, that is configured with three prisms having shapes different from each other and having two types of multilayer dielectric films along the interfaces between the three prisms.

Although the modulation system 925 according to the above-described embodiment includes the three liquid crystal panels 925R, 925G, and 925B, an optical modulation device may be configured with two, four, or more liquid crystal panels, according to the present invention.

Although liquid crystal panels are used as an optical modulation device, according to the above-described embodiment, devices other than the liquid crystals, such as plasma elements or micro mirrors, may be used for the projector according to the present invention.

Although the liquid crystal panels 925R, 925G, and 925B according to the above-described embodiments modulate while transmitting R, G, and B luminous fluxes, the present invention is applicable to a projector in which a reflective electro-optical device modulates, reflects, and emits light incident thereto.

As described above, the projector according to the present invention is provided with the fixing parts at the periphery of the mounting part for fixing the mounting part to the optical-component casing, whereby the mounting part is not required to have a thickness such that a fixing unit such as threaded holes can be formed, thereby reducing the thickness of the mounting part. Therefore, the overall height of the projector can be reduced, thereby reducing the profile and size of the projector.

What is claimed is:

1. A projector comprising:
    a plurality of optical modulation devices that modulate a plurality of colored light beams in accordance with image data;
    a prism that synthesizes the modulated light beams modulated by the optical modulation device having an upper face and a bottom face;
    an optical-component casing to which the prism is to be fixed; and
    a supporting member that supports the prism and fixes the prism to the optical-component casing, the supporting member being provided with a mounting part on which the prism is mounted and fixed thereto, and a fixing part by which the mounting part is fixed to the optical-component casing, the fixing part being disposed at the periphery of the mounting part and outside side faces of the prism.

2. The projector according to claim 1, wherein the mounting part is formed in a substantially rectangular shape in plan view having four corners, and the fixing part is disposed at a pair of corners, opposing each other along one diagonal line therebetween, of the four corners of the mounting part.

3. The projector according to claim 2, wherein the optical-component casing is provided with supporting part disposed in a position of the optical-component casing associated with another diagonal line of the mounting part along which the fixing part is not provided, for supporting the mounting part at the bottom thereof.

4. The projector according to claim 1, wherein the prism and the plurality of optical modulation devices are disposed in a concave part defined by the optical-component casing and having a shape of the letter U in plan view, and a cover part that covers the fixing part is formed so as to conceal the fixing part when the concave part is viewed from the upper face or from the bottom face of the prism.

5. The projector according to claim 4, wherein the optical-component casing is provided with a fan-mounting part to which a cooling fan for cooling the plurality of optical modulation devices is fixed, and the fan-mounting part also serves as the cover part.

6. The projector according to claim 4, wherein the mounting part is formed in a substantially rectangular shape in plan view having four corners, and the fixing part is disposed at a pair or adjacent corners of the four corners of the mounting part.

* * * * *